United States Patent

[11] 3,602,465

| [72] | Inventor | Michel E. Velut<br>Lyon, France |
|---|---|---|
| [21] | Appl. No. | 889,265 |
| [22] | Filed | Dec. 30, 1969 |
| [45] | Patented | Aug. 31, 1971 |
| [73] | Assignee | Caoutchouc Industriel De Rochassieux<br>La Bridoire (Savoie), France |
| [32] | Priority | Dec. 31, 1968 |
| [33] | | France |
| [31] | | 50.876 |

[54] ANTIVIBRATORY SUPPORTS
13 Claims, 13 Drawing Figs.

[52] U.S. Cl. ..................................................... 248/24,
248/358, 267/153
[51] Int. Cl. ..................................................... F16f 15/00
[50] Field of Search ............................................ 248/358,
22, 24, 18, 15, 9, 10; 267/152, 153

[56] References Cited
UNITED STATES PATENTS

| 1,691,723 | 11/1928 | Keys | 248/10 UX |
|---|---|---|---|
| 1,864,080 | 6/1932 | Madge | 248/9 X |
| 2,195,873 | 4/1940 | Lord et al. | 248/9 |
| 2,212,142 | 8/1940 | Austin et al. | 248/22 |
| 2,457,058 | 12/1948 | Markowitz | 248/22 UX |
| 3,145,004 | 8/1964 | Sherrick | 248/9 |
| 3,455,526 | 7/1969 | Sho Orii | 248/24 |

FOREIGN PATENTS

| 448,478 | 5/1948 | Canada | 248/358 |
|---|---|---|---|
| 1,428,341 | 1/1966 | France | 248/24 |
| 1,063,426 | 8/1959 | Germany | 248/24 |
| 521,520 | 5/1940 | Great Britain | 248/358 |

*Primary Examiner*—J. Franklin Foss
*Attorney*—Spencer & Kaye

ABSTRACT: This invention relates to an antivibratory support comprising at least one solid resilient element interposed between a support bedplate and a support element, wherein it comprises at least one means for applying to at least one of the solid resilient elements a prestress in at least one direction, this means abuts exclusively on at least two of the rigid elements of this support and said means is preferably adjustable and independent of the means for changing the level.

Inventor
Michel E. Velut

ANTIVIBRATORY SUPPORTS

The present invention relates to an improvement in antivibratory supports of the type which comprises one or more solid resilient elements interposed between a mass to be "insulated" and the environing element which has to support it.

It is important to note that the term "absorption" is often used to designate two different aspects of vibratory phenomenon.

In order to clarify the following description, these two aspects will be distinguished in the following manner:

when it is a question of obtaining a reduction in the intensity of the dynamic stresses transmitted to the environment or received therefrom due to vibrations, the term "active insulation" or "passive insulation" respectively will be used, and when it is a question of obtaining a reduction in the amplitude of the oscillatory movement (whether it be periodic or aperiodic) within the above-mentioned mass, the term "absorption" will be used.

Known antivibratory supports or those which are described in the present invention are intended for:

ensuring an active or passive insulation;

ensuring an absorption in the great majority of cases;

favoring the operation of machines or apparatus, which is produced by vibrations (vibrating conveyors for example);

permitting the implantation of machines or apparatus without sealing, which is more and more sought after, particularly for adapting the workshop implantations to large scale manufactures in order to obtain a maximum productivity.

In order to solve the majority of problems thus raised, a large number of various models have at the moment been provided.

However, even through the ranges of models are very varied, great difficulties are still encountered when a maximum efficiency of insulation is desired, for the following reasons:

It is absolutely impossible to create as many models of supports as there are cases; it is consequently necessary to be satisfied with devices which respond only approximately to the particular problems.

In the vast majority of cases, it is practically impossible to envisage sufficiently refined dynamic analyses for each problem (taking into account the complexity of the machines, the variable conditions of their use, the variable conditions of environment, the variable nature of the ground, etc.); because these analyses are much too long and costly; in addition, in the more and more general case of the implantation of the machines often having to be quickly modified for the purpose of a maximum productivity, it would be necessary to restart the dynamic analysis and change antivibratory supports almost each time.

It is often necessary to limit the insulation in order to obtain a satisfactory absorption; in fact, the course necessary for the deceleration of the vibratory movement to correspond to a good insulation may be incompatible with the structure of the machine or the conditions of use thereof (manual service, for example).

Or the suppleness of assembly corresponding to a maximum of insulation leads to a resonant input with catastrophic effects. The limit, which is always too narrow, of a restricted range of antivibratory supports is consequently not favorable to the obtaining of the best compromise between insulation and absorption.

The load of a machine is almost always unequally distributed on its various support points. If antivibratory supports have the same static and/or dynamic resilient characteristics are disposed at said points, this may result in serious disadvantages: deformations of the structures, resonant input of certain support points, etc. Now, it is often impossible to effect compensations with the aid of additional masses, because the structure of the machine is rarely suitable therefor or the ground cannot support them (particularly when not on ground level). It is then necessary to use antivibratory supports whose resilient reactions are as proportioned as possible to the loads supported by the corresponding support points. Now, it is not easy, with a limited range of supports, to produce the optimal conditions mentioned hereinabove, of resilient equilibrium between the various points of support.

Finally, when it is a question of maintaining the vibrations of a system, it is rare that an existing model of a support has a suitable frequency close to the resonant frequency and one is then led to modifying that of the system by assembling additional masses at suitable spots. It is obvious that this solution is not always acceptable because the solidity of this system risks being compromised and the environment risks being disturbed.

The present invention has for its object to remedy these disadvantages by improving the antivibratory supports with solid resilient element, so that their resilient characteristics are adjustable. With a restricted range of models, a practically continuous progression of the static and dynamic resilient characteristics may also be obtained.

The improved antivibratory support according to the invention comprises at least one means for applying a prestress to at least one of the solid resilient elements in a main direction which is substantially perpendicular to the support bedplate without sealing, this means preferably being adjustable and independent of the level-changing means.

The adjustable prestress applied to a solid resilient element enables the actual frequency of the support, its absorption constant upon which the insulation depends, its resilient constant, upon which the absorption depends, and possibly other parameters to be modified.

Consequently, by intervening in the choice of the model of solid resilient element, the number of elements used, the intensity and direction of the prestress, the checking of the solid flow of this or these elements, etc. under the conditions of use, the most appropriate resilient characteristics may be chosen and the best compromise may be obtained between the insulation and the absorption on the spot.

This result is achieved simply and suitably, at the place of assembly, by the user himself, without the use of complicated apparatus and at a moderate price.

Antivibratory supports are known with hydrostatic compression, such as that described in French Pat. No. 1,128,970.

They are constituted by a tubular envelope made of sintered steel substantially with an S-section, provided at its center with a constriction and filled, under a pressure adjustable from the outside, with a viscous and compressible elastomer.

The absorption obtained is mainly due to the viscous frictions of the elastomer forced to flow inside its envelope and its resilient characteristics may be modified by modifying the pressure of the elastomer. However, these supports have the double disadvantage of being of a high cost price and of a limited reliability due to the relatively rapid aging of the viscous elastomer.

These known supports proceed differently from that of the invention. In fact, in the invention, the modification of the resilient characteristics is due to an adjustment in the prestress of a simple or composite solid resilient element which acts alone on the load supported and the solid flow of which is of nature substantially different from that of a fluid flow.

On the other hand, in said known supports, the resilient characteristics are corrected by causing the internal volume of the tube and of an annexed chamber to vary; this results in a modification of the fluid flow of the fluid elastomer inside the steel tube and consequently a variation in the viscous frictions; thus, the resilient characteristics used are those of the tube corrected by these viscous frictions.

The support of the invention is thus clearly different from the known supports with hydrostatic compression. It does not possess their drawbacks and has in addition the following supplementary advantages:

they enable the properties of any solid resilient element to be used, and particularly the most recent ones, whose resistance to aging is exceptional, hence a high sensitivity and an excellent competence, they may be lower in height and therefore cause a much less surelevation of the "insulated" load.

The invention will be described in greater detail with reference to the accompanying drawings, in which.

Figure 2:
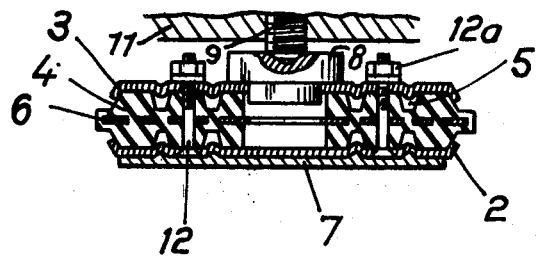
FIG. 2 is a section along line II—II of FIG. 1.
Figure 1:
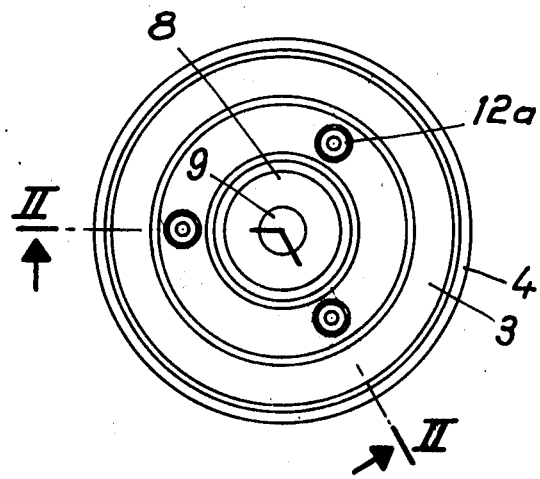
FIG. 1 is a plan view showing, from above, a first embodiment of the antivibratory support of the invention.

In the embodiment shown in FIGS. 1 and 2, the antivibratory support comprises, sandwiched between a bedplate 2 and a support plate 3, a nonfluid resilient element 4. This element is constituted by a solid elastomer based on neoprene, nitrile or butyl and the Shore hardness of which is 85 for example. Said element is a coronal plate which has on its two upper and lower faces annular grooves 5 defining flanges subjected directly to the pressure of the load. There may be a metallic reinforcement 6 in the middle of the resilient element 4.

The bedplate 2 is a rigid metal disc, whose shape matches the lower contour of the resilient element 4. Its lower face is covered by a nonslip coating 7.

The support plate 3 is a rigid metal crown whose shape matches the upper contour of the resilient element 4, and the central bore of which is provided for housing and holding a cupel-shaped member 8 on which the jack 9, constituting one of the bases of the load 11 to be supported, abuts.

According to the invention, in addition to the known members which were described hereinabove, the antivibratory support comprises pins 12 which pass through the bedplate 2, the resilient element 4 and the plate 3, at points having a regular angular and radial distribution. In the example chosen, this antivibratory support comprises three pins 12, each shifted with respect to the other two by 120° and situated at equal distance from the cupel 8.

It is possible, by acting on the nuts 12a of the pins 12, to produce in the resilient element 4 a prestress which is added to the stress due to the load laid on the plate 3.

Now, it is known that the actual frequency of an antivibratory support varies with the stress which is undergone by its resilient element. The pins 12 thus enable this stress to be increased, without modifying the load, and consequently enable the actual frequency of the support to be shifted in order to bring it closer to or further from the resonant frequency of the system.

For example, when it is desired to maintain the vibrations of the mass 11 in order to increase their amplitude, it is sufficient to act on the nuts 12a so that the prestress produced is such that the frequency of the antivibratory support in question becomes equal or close to the frequency of said vibrations (or of a multiple or submultiple of this frequency). A phenomenon of resonance is then established.

On the other hand, when it is desired to dampen these vibrations, the adjustment of the prestress by the nuts 12a is carried out so as to move away from the resonant frequency.

In the embodiment of FIG. 2, the jack 9 is threaded and screwed directly into a tapped hole in the load 11. It bears directly on the cupel-shaped member 8.

Figure 3:
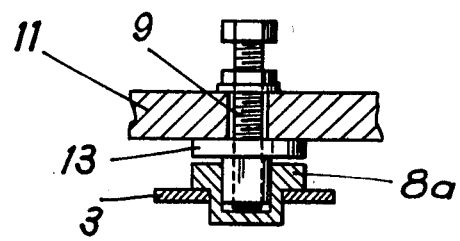
FIG. 3 is a partial view similar to FIG. 2, illustrating a variant of the antivibratory support for supporting the jack for adjusting the level, constituting one of the bases of the load to be supported.

In the variant of FIG. 3, the element 11 to be insulated is traversed by the jack 9 and rests on the upper end or support face of a socket 13 connected by screwing to the jack 9, and the lower end of which may slide axially, without being able to rotate, in a recess made to this end in the center of the cupel-shaped member 8a. This level changing device is particularly advantageous when the machine frames have smooth holes and especially when these holes are inaccessible from below.

In both cases, the jack 9 has for its aim to permit compensation of the possible defects in the ground level on which the antivibratory supports of the same element 11 to be insulated rest.

It is important to note that the adjustment of the level by means of the jack 9 is independent of that of the preconstraint by the pins 12.

In the embodiment illustrated in FIG. 2, the bedplate 2 and the plate 3 are mechanically connected together, by means of pins 12. This mechanical connection therefore leaves a risk of the mechanical vibrations of the plate 3 being transmitted to the bedplate 2, which could sometimes affect the efficiency of the antivibratory support.

Figure 4:
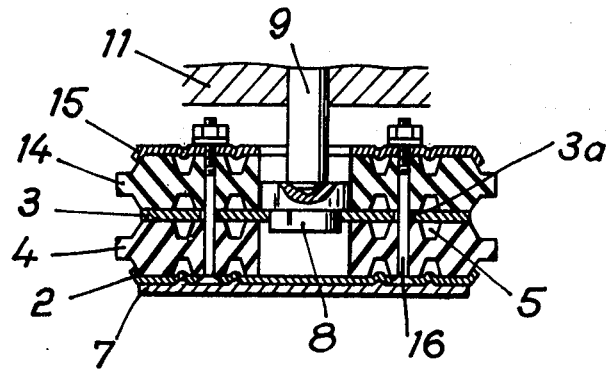
FIGS. 4 to 7 are views similar to FIG. 2, representing other preferred embodiments of the antivibratory support.

FIG. 4 shows another embodiment of this antivibratory support, according to which there is no mechanical connection between the support plate and the bedplate.

This FIG. 4 shows the bedplate 2, with its nonslip coating 7, the support plate 3 and the resilient element 4 sandwiched between the bedplate 2 and the plate 3; this latter is surmounted by a second resilient element 14 identical to the preceding one and covered by a clamping plate 15. The pins 16 corresponding to pins 12 extend between the bedplate 2 and the clamping plate 15. In order to eliminate any risk of contact with the plate 3, the pins 16 traverse holes 3a therein, whose diameter is clearly greater than their own diameter.

As in the preceding examples, the plate 3 receives the support cupel-shaped member 8 of the jack 9.

It is obvious that the resilient elements 4 and 14 cooperate in order to absorb the vibrations and to insulate the element 11 from the environment or to amplify these vibrations.

Figure 5:
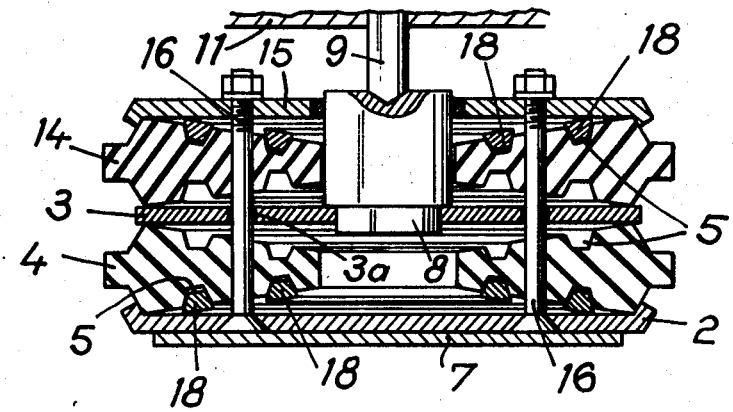

In the embodiment shown in FIG. 5, the resilient elements 4 and 14 have a concave biconical section whose inclination has been deliberately exaggerated in the drawing, in order that the invention may be more readily understood. This results in a progressively larger resilient mass being produced as the pins 16 are tightened. Thus, the resilient characteristics of the support are modified in rest position and during operation not only by the adjustable clamping force of the pins 16, but also by the contact surface concerned which varies as a function of this force and the load.

Of course, a single face of each resilient element may be incurved and the incurvation of the faces may be convex, instead of being concave. Moreover, the faces of the resilient elements may be flat and it is then the bedplate and the plates which are conformed in shape.

The means provided in the preceding to apply a prestress to the solid resilient elements is constituted by a plurality of pins.

Figure 7:
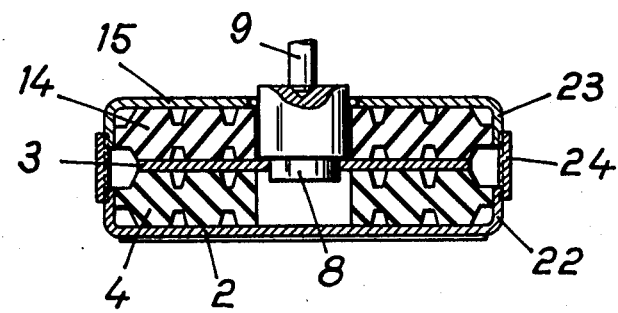
Figure 8:
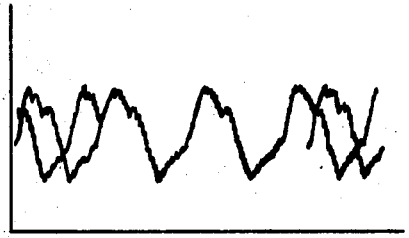
FIGS. 8 to 10 are oscillograms showing, under conditions defined hereinafter, the vibrations of a lathe detected respectively on the bed, on a base and on the ground near this base, when the supports are prestressed by a compression of 10 percent.
Figure 11:
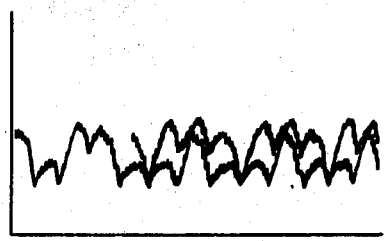
FIGS. 11 to 13 are oscillograms similar to those of FIGS. 8 to 10, showing these vibrations when the supports are prestressed by a compression of 15 percent.
Figure 9:
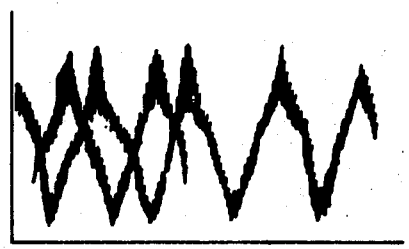
Figure 12:
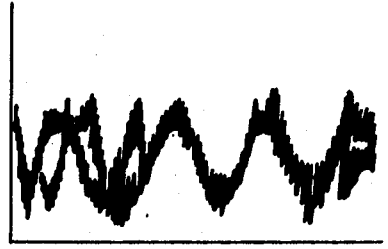

Other means may be used and a particularly advantageous means is shown in FIG. 7. The embodiment shown in FIG. 7 includes the bedplate 2, the support plate 3 and the clamping plate 15, between which are interposed the resilient elements 4 and 14. The bedplate and the clamping plate are unitary with edges or flanges 22 and 23 respectively, extending in one another and produced by stamping for example. These edges are threaded with contrary pitches and connected by a tapped ring 24, also with contrary pitches, so that by screwing or unscrewing by means of a spanner for example, the rigid elements 2 and 15 mentioned above are made to approach or move away from one another, and the prestress of the resilient elements 4 and 14 is thus regulated. Moreover, said latter may advantageously be maintained on their periphery by the edges 22 and 23, but it is preferable that a clearance be established between them and the cupel-shaped member 8 on which the jack 9 is supported.

It is important to note that, in the above examples, the means used (pins 12, 16 or ring 24) produce in the resilient elements 4, 14 prestress oriented in a perpendicular to the bedplate 2. Of course, this direction may be oblique in certain particular cases.

In addition, it may be advantageous to combine with this prestress of "perpendicular" direction a prestress of "any" direction which is in fact determined by the problem to be solved. The dominating prestress is generally that of perpendicular direction, but it may be necessary in certain particular cases that the dominating prestress be that of "any" direction (parallel or oblique) and sometimes the prestress of perpendicular direction must be rendered negligible.

The embodiment of FIG. 5 precisely illustrates an example enabling a prestress of "any" direction to be produced. Each annular groove 5 of trapezoidal section of the resilient elements 4 and 14 is there provided with a ring 18 with the same hardness or a hardness different from that of said resilient elements. The penetration of these rings into the grooves 5 thus creates, during tightening, radial stresses whose value may be modified by the changing of the material constituting the said rings 18.

Of course, these latter may be replaced by fingers or other members in the form of angles, which are then housed in hollows of complementary shape made in the resilient element or elements and applied against the contiguous rigid element.

Other means may be used to produce this prestress of "any" direction. In particular, if reference is made to FIG. 7, there may be provided between the resilient elements 4, 14 on the one hand, and the edges 22, 23 on the other hand, pushes; said latter are oriented in the direction of the prestress to be produced and their shape depends upon that of said resilient elements; they cooperate in addition with adjustable actuating members such as screws, cams or the like, abutting on said edges.

Figure 6:
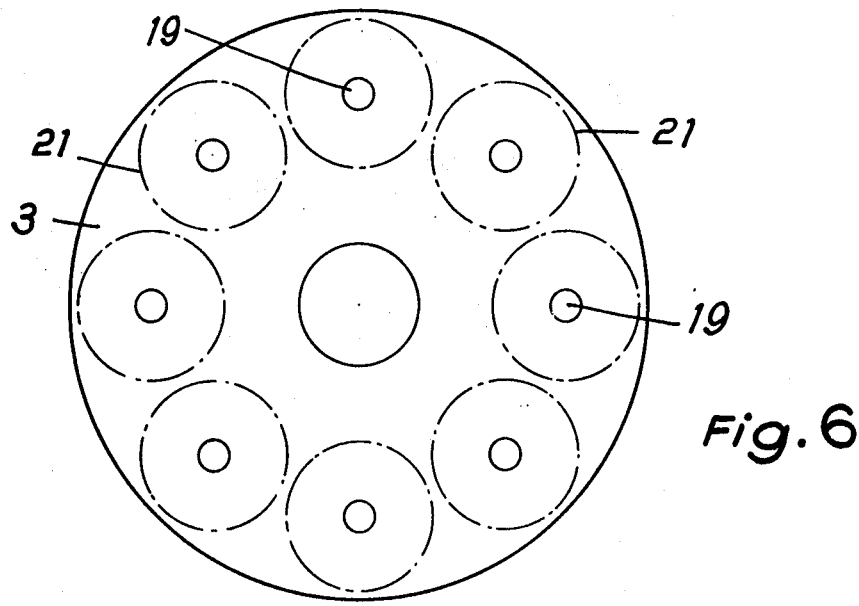

Moreover, FIG. 6 shows an embodiment in which each element 4 and 14 is replaced by a plurality of circular resilient cleeves 21 whose number may be equal to that of the holes 19 provided for the passage of the pins 16.

By varying the number of holes 19 used, it is possible to modify the characteristics of the support.

It is consequently ascertained that the resilient elements can possess very varied shapes and therefore those which have been illustrated are in no way limitative.

In addition, it is not indispensable to produce the elements 4, 14 and 21 solely from an elastomer. In fact, in certain particular cases, it may be advantageous to incorporate with said latter or to connect them with steel springs for example.

In all the examples described hereinabove, it is possible to modify the characteristics of the support by replacing each resilient element 4 and 14 by a stack of a plurality of resilient elements.

The antivibratory support of the invention actually presents the advantages mentioned hereinabove, further proof being given by the oscillograms shown in FIGS. 8 to 13.

The tests were carried out for an Ernault lathe B type 200 H. N. weighing 1,500 kg. and mounted on six antivibratory supports.

Each support is of the type shown in FIG. 4 and comprises two resilient elements in the form of a ringed plate, the outer diameter of which is 134 mm. and the thickness 19 mm., each plate being constituted by an elastomer based on acrylonitrile and the Shore hardness of which is 45. The supports are simply placed on a concrete slab on the ground.

For the tests, an unbalance of 2.137 kg. was created on the mandrel, said mandrel being rotated at a speed of 500 r.p.m.

The oscillograms shown were recorded on a Philipps vibration measuring chain comprising a pickup, a calibrator and an oscilloscope.

Figure 10:
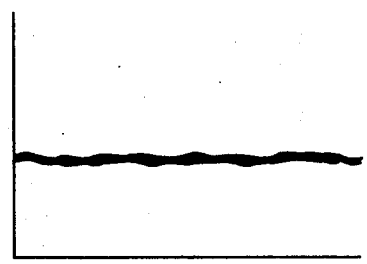
Figure 13:
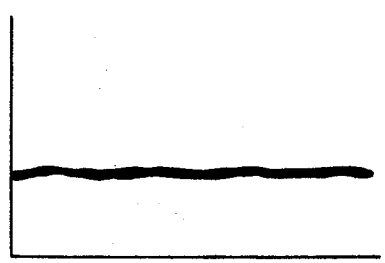

When all the supports are prestressed due to a compression of 10 percent (FIGS. 8, 9 and 10), it is ascertained that the insulation and absorption are excellent, since:

on the bed of the lathe (FIG. 8), the amplitude of the vibrations is 40 microns, on one of the bases of the lathe (FIG. 9), this amplitude is 60 microns, and on the ground near this base, the amplitude is no more than 3 microns (FIG. 10).

The insulation and the absorption are further improved if the prestress corresponds to an increase of 15 percent (FIG. 11 to 13), since:

the amplitude of the vibrations on the bed of the lathe (FIG. 11) is 21 microns, this amplitude on one base (FIG. 12) is 35 microns, and said amplitude on the ground near this base (FIG. 13) is 2.7 microns.

What is claimed is:

1. An antivibratory support for isolating a vibrating structure from a support body, comprising, in combination:

a rigid bedplate arranged to be supported by the support body;

a first solid resilient element resting on, and permanently supported exclusively by, said bedplate;

a rigid support plate resting on, and permanently supported exclusively by, said first solid resilient element and including means for supporting the vibrating structure;

a second solid resilient element resting on, and permanently supported exclusively by, said support plate;

a rigid clamping plate resting on said second resilient element and permanently separated from said support plate; and adjustable compression means connected between said bedplate and said clamping plate, and permanently isolated from said support plate, said compression means being operatively associated with at least one of said resilient elements for compressing said element in at least one direction by any selected amount within a predetermined range when said support is supporting the vibrating structure, thereby varying the vibration absorption and insulating characteristics of said support;

said support being free of any connection to the support body and said bedplate and clamping plate being permanently isolated from said support plate, and isolated from each other, by said first and second resilient elements.

2. An arrangement as defined in claim 1 further comprising isolating means interposed between said bedplate and the support body for isolating said compression means from the support body.

3. An antivibratory support as claimed in claim 1, wherein each resilient element is a coronal plate made of a solid elastomer having annular grooves in its faces applied against said rigid plates.

4. An antivibratory support as claimed in claim 1, wherein each resilient element is constituted by a plurality of sleeves made of a solid elastomer and a variable number of these sleeves are inserted in housings regularly spaced out in said rigid plates.

5. An antivibratory support as claimed in claim 1, wherein the said compression means is oriented in a direction substantially perpendicular to said bedplate.

6. An antivibratory support as claimed in claim 5, wherein said compression means is also oriented in another direction.

7. An antivibratory support as claimed in claim 5, wherein said compression means connects said bedplate to said clamping plate and is arranged to perform a screwing action in order to move them toward one another.

8. An antivibratory support as claimed in claim 5, wherein the distance of at least one of said rigid plates from the face opposite its contiguous resilient element is variable in radial direction for causing the portion of said resilient element which is compressed to increase as the amount of compression in the axial direction increases.

9. An antivibratory support as claimed in claim 8, wherein said at least one rigid plate is flat and at least one face of at least one of the solid resilient elements contiguous therewith is incurved.

10. An antivibratory support as claimed in claim 7, wherein said compression means is constituted by a plurality of pins passing through the solid resilient element or elements, the head of the nut of these pins abutting on said bedplate and said clamping plate.

11. An antivibratory support as claimed in claim 7, wherein said compression means is constituted by a tapped ring of contrary pitches and screwed on threaded edges or flanges likewise of contrary pitches, these edges being unitary with said bedplate and said clamping plate.

12. An antivibratory support as claimed in claim 6, wherein it comprises, in addition to said compression means for applying a compression in a direction substantially perpendicular to the bedplate, an angle-shaped element housed in a complementary recess formed in at least one face of at least one of said solid resilient elements and arranged to be in contact with the rigid plate contiguous therewith.

13. An antivibratory support as claimed in claim 12, wherein each angle-shaped element is a ring housed in the corresponding groove of a coronal resilient element having corrugated faces.